United States Patent
Bombardier

[15] 3,698,497
[45] Oct. 17, 1972

[54] VARIABLE SPEED TRANSMISSION SYSTEM AND BRAKING MEANS

[72] Inventor: Jerome Bombardier, Valcourt, Quebec, Canada

[73] Assignee: Bombardier Limited, Valcourt, Quebec, Canada

[22] Filed: July 23, 1970

[21] Appl. No.: 57,433

[52] U.S. Cl. ............ 180/5 R, 74/230.17 A, 180/9.64
[51] Int. Cl. ..................... B62m 9/08, B62m 27/02
[58] Field of Search ............ 180/5 R, 6.7, 9.64, 70 R; 115/1 R; 74/230.17 A

[56] References Cited

UNITED STATES PATENTS

| | | | |
|---|---|---|---|
| 3,481,416 | 12/1969 | Caron | 180/5 R |
| 3,474,751 | 10/1969 | Hebert | 180/5 R X |
| 2,938,408 | 5/1960 | Uher | 74/722 |
| 3,023,824 | 3/1962 | Bombardier | 180/9.64 |
| 3,517,457 | 6/1970 | Peno | 180/5 R X |
| 3,111,858 | 11/1963 | Coutant | 74/230.17 A |
| 3,521,718 | 7/1970 | Masaoka et al. | 180/5 R |
| 3,309,150 | 3/1967 | Marier | 180/5 R X |

FOREIGN PATENTS OR APPLICATIONS

| | | | |
|---|---|---|---|
| 821,059 | 8/1937 | France | 180/5 R |

Primary Examiner—Benjamin Hersh
Assistant Examiner—Leslie J. Paperner
Attorney—Larson, Taylor and Hinds

[57] ABSTRACT

A snowmobile variable speed transmission system using a sheave drive, the driven pulley of which is mounted directly on one end of the drive sprocket axle; thus the chain case, including the chain and all the associated parts, are no longer required in the transmission of power from the engine to the endless track. The other end of the drive sprocket axle is used to mount the disc of the brake mechanism.

10 Claims, 5 Drawing Figures

VARIABLE SPEED TRANSMISSION SYSTEM AND BRAKING MEANS

This invention relates to a variable speed transmission system and to a brake system for a snowmobile or similar track-propelled vehicles of the kind which include a drive pulley and a driven pulley cooperating with a V-belt to transmit torque from the engine to the propulsive endless track and in which the pulleys have a variable effective diameter according to the amount of power being transmitted.

Present snowmobile transmission systems consist in having the driven pulley mounted on a driven shaft which is operatively connected to the drive sprocket axle by means of a chain engaging a pair of sprockets mounted, respectively on the driven pulley shaft and on the drive sprocket axle. The torque-transmitting chain assembly is enclosed in a lubricant-containing casing secured to the chassis of the snowmobile. The upper portion of the chain casing also rotatably supports the driven pulley shaft onto the snowmobile frame. The brake mechanism found on most of these vehicles consists in actuatable components which are brought into frictional engagement with one of the driven pulley members.

An object of the present invention is the provision of a chainless transmission system for use in snowmobiles, or the like, in which the driven pulley is mounted directly on the drive sprocket axle thereby eliminating the chain case and the other many associated parts, which may number up to fifty on certain snowmobiles. This elimination evidently results in a reduction in weight as well as in a reduction in cost. It also provides other important advantages as will immediately be recognized by snowmobilers. For example, the absence of chain case oil in the transmission system means the total elimination of oil leaks which not only affect the performance of the brake system because of wet linings but also occasion slippage of the V-belt in relation to the inner faces of the driven pulley as soon as an oil seal begins to wear. The engine compartment where oil splashing frequently occurred is now also far easier to keep clean, and one no longer has to control the level of oil in the chain case, hitherto an item of routine inspection. Furthermore, the direct drive system according to this invention does away with the need for regular adjustment in chain tension, and of course the possibility of breakdown due to chain failure is also eliminated.

The present invention therefore provides a variable speed transmission system for use in a motorized track-propelled vehicle such as a snowmobile which comprises an engine drive shaft operatively associated with the engine of the vehicle, a drive pulley fixedly mounted for rotation on one end of the engine drive shaft, a drive sprocket axle mounted beneath the chassis of the vehicle and in driving engagement with the track of the vehicle, a driven pulley mounted for rotation directly on the drive sprocket axle at one extremity thereof, and an endless V-belt operatively connecting the drive pulley and the driven pulley so that torque in the engine drive shaft may be transmitted to the drive sprocket axle via the drive and driven pulleys.

Another object of the present invention resides in the provision of a more direct braking operation; this is accomplished by directly reducing the rotational speed of the drive sprocket axle rather than reducing the rotational speed of the driven pulley members. The brake mechanism consists of a disc keyed on the other end of the drive sprocket axle and of a brake band disposed circumferentially of the disc and brought into frictional engagement therewith.

Other objects and advantages will be apparent from the following description of the invention and the accompanying drawings in which.

Figure 1:
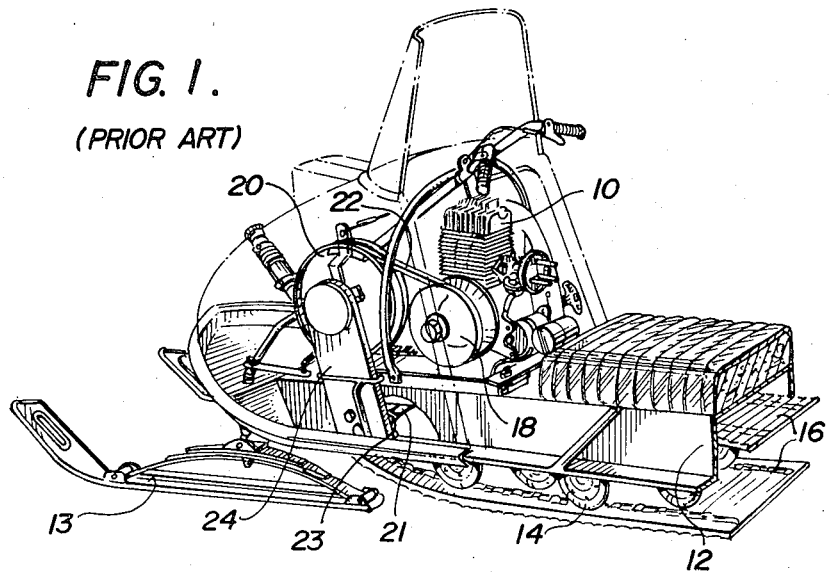
FIG. 1 is a side perspective view of a portion of a snowmobile of the prior art illustrating the main parts of the vehicle, including a transmission system.

Referring to FIG. 1, representing a portion of a snowmobile having a transmission system which is found on most single track snowmobiles, a motor or engine 10 is rigidly mounted on an inverted U-shaped chassis 12 steered by skis 13. Beneath chassis 12 are suspended a plurality of intermediate supporting bogie wheels 14 running over the inside surface of the lower run of an endless flexible track 16 propelling the vehicle. Another type of suspension is also well known wherein the bogie wheels are replaced with slide elements. The transmission system used on this type of vehicle is a variable speed expansible sheave mechanism using a drive pulley 18 mounted on the engine drive shaft or a coaxial extension thereof, and a larger driven pulley 20, both pulleys cooperating by means of a V-belt 22. Torque is transmitted to the endless rubber belt 16 by means of a chain drive connecting the shaft of the driven pulley 20 to axle 21 of the track-engaging sprocket 23. The chain drive consists of a sprocket and chain assembly enclosed in a lubricant-containing chain case 24. The chain engages a first sprocket (not shown) mounted on the shaft of the driven pulley 20 and a second sprocket (not shown) mounted on the sprocket axle 21.

Figure 2:
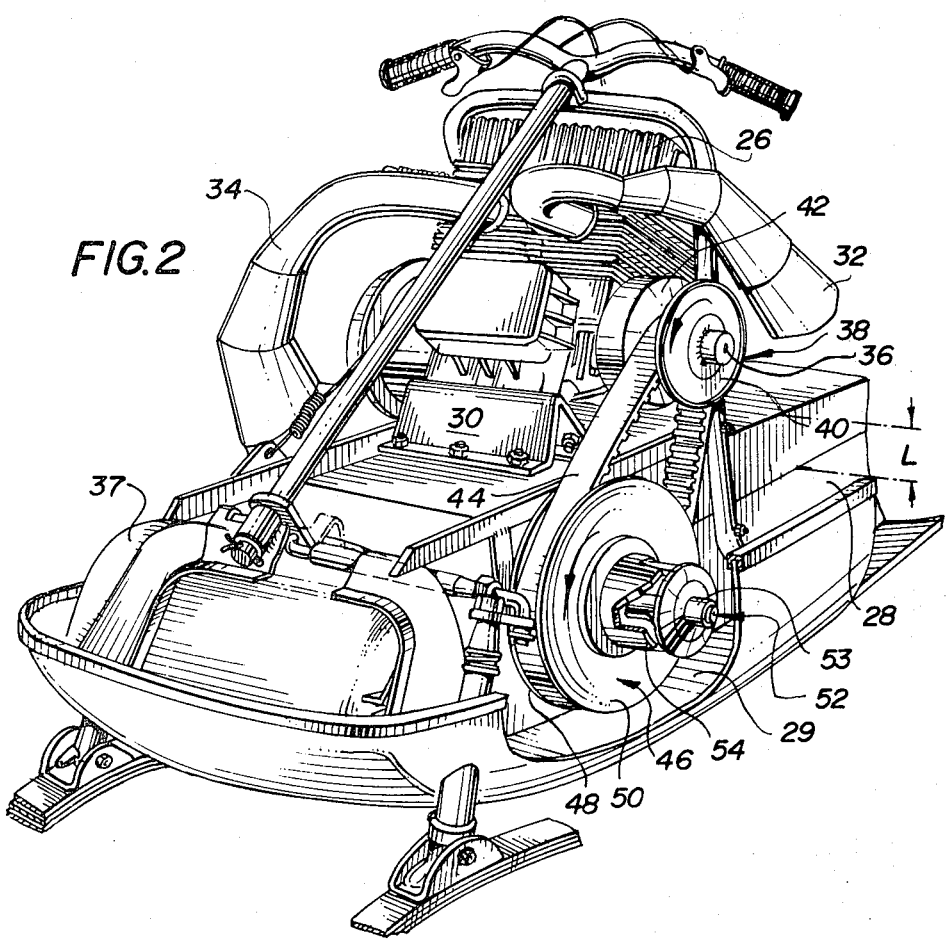
FIG. 2 is a front perspective view of a portion of a snowmobile illustrating a transmission system in accordance with the present invention.
Figure 3:
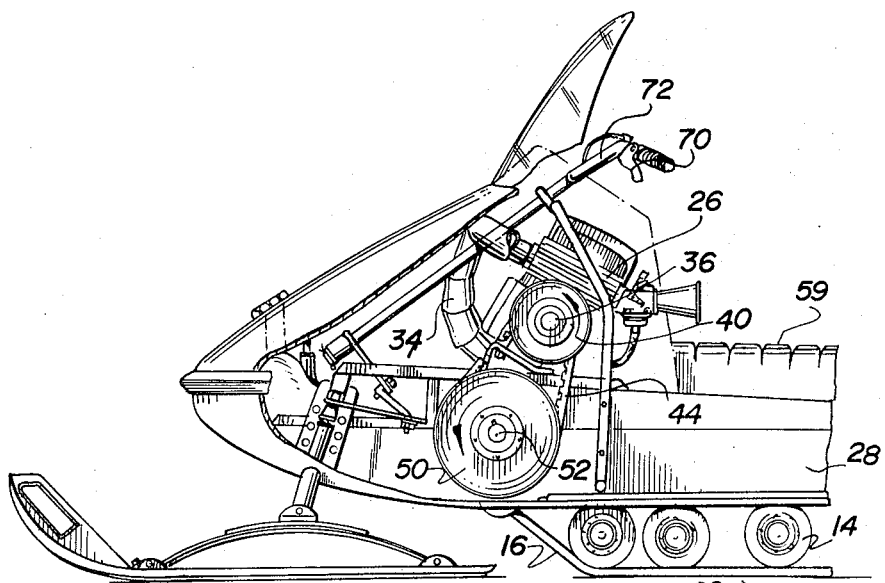
FIG. 3 is a side elevational cut-away view as seen from the right of FIG. 2.

A snowmobile incorporating a simplified but improved transmission system in accordance with the present invention is illustrated in FIGS. 2 and 3. A motor or engine 26 is supported on the chassis 28 of the vehicle by means of a bracket 30 bolted thereto. The motor shown is one used for high performance and two tuned exhaust systems 32 and 34 are shown associated with the motor. However, the invention is equally adaptable to standard vehicles. Drive shaft 36 consists of a threaded sleeve secured to the engine's crank-shaft (not shown); it carries drive pulley 38 consisting of two half-pulleys or members 40 and 42. Half-pulley 40 is fixed on drive shaft 36, and half-pulley 42 is movable lengthwise thereon. The provision of a threaded sleeve extending from the crank-shaft facilitates removal of drive pulley 38 without dismantling the engine. The construction of the drive pulley as well as that of the driven pulley, as hereinafter described, are well known and used and will not be described in detail. Suffice it to say that drive pulley 38 is spring biased in the open position (as shown in FIG. 2) with enough separation between discs 42 and 40 for a neutral drive condition below a given maximum idle speed of engine 26, and a governor is associated with slidable half-pulley 42 as the speed of rotation of engine 26 increases. The driven pulley 46 also consists of two half-pulleys 48 and 50; half-pulley 48 is fixed on shaft means 52 and half-pulley 50 is movable lengthwise thereon and is yieldingly urged toward fixed half-pulley 48 by means of a load-sensitive spring and cam arrangement 54 also well known in the art. An endless V-belt 44 interconnects drive pulley 38 with driven pulley 46 in the usual manner.

With the elimination of the chain mechanism hereinbefore noted, driven pulley 46 is mounted on shaft means 52 which serves to support and rotate the track-engaging sprockets (seen in FIG. 1). Shaft means 52 therefore consists of a drive sprocket axle as shown at 21 in FIG. 1, and a threaded sleeve 53 which carries driven pulley 46 and which is screwed onto an end of the drive sprocket axle. The use of a threaded sleeve 53 rather than an integral extension of the drive sprocket axle facilitates installation and removal of driven pulley 46. It will also be seen that driven pulley 46 has been rotated 180 degrees, when compared to that of FIG. 1, to enable the fixed half-pulley to be adjacent the vertical wall of chassis 28 and the movable half-pulley spaced apart therefrom thereby to minimize the bending moment to which shaft means 52 is subjected. This also results in an advantageously compact arrangement. The load-responsive cam mechanism 54 should also be corrected if it is desired to make it effective. Specifically, the pitch of the cam surfaces must be changed 180°. Drive pulley 38 whose median plane should always remain substantially aligned with that of driven pulley 46 must also be rotated 180° from its conventional position. This can easily be effected by simply boring and threading the outer end of the sleeve of a conventional expansible drive pulley, and mounting same onto the output shaft of the motor.

It has also been found that for adequate clearance between the driven pulley 46 and the forward region of footrest 29, the upper portion of the inverted U-shaped chassis 28 adjacent the drive sprocket axle must be raised as shown at L in FIG. 2 as well as the bearings onto which is journalled the drive sprocket axle. This of course results in a slightly higher forward portion of the upper run of endless track 16, although the rear portion may remain at the same height. The raised portion of the chassis can therefore gradually decrease from the front to the rear of seat 59 (see FIG. 3). Furthermore, in order not to displace the steering column 35 from its usual position, the motor may be set in an inclined position (for example 35° backward) and held there by bolted bracket 30. However the engine could be located forwardly of the driven pulley 46 and of the steering column 35, but such an arrangement would inevitably necessitate minor modifications in the steering system and in the location of the gas tank 37.

It will therefore be seen that the present invention provides a snowmobile drive system wherein the power delivered by the engine crank-shaft is transmitted to the drive sprocket axle by means of drive pulley directly rotated by the engine's output, and a driven pulley coupled with the drive pulley by means of a V-belt and directly acting upon the drive sprocket axle. The result is a greatly simplified transmission system wherein the disadvantages inherent to a chain case assembly have disappeared namely breakdown due to chain breakage, loss of power because of friction, inertia of the body of lubricant within the chain case, regular adjustments extra weight and costs of production. The step-down function of the chain mechanism which enables a given engine to reach peak performance must, however be compensated for; in accordance with this invention this is accomplished in different ways, depending on the degree of performance desired and the available power-to-weight ration. Firstly, tests have shown that conventional drive sprockets which have between nine to 12 teeth can operate equally well in reduced size versions with as few as six teeth in the case of a 2-inch pitch track system. Hence, significant ratio reduction can be obtained with smaller drive sprockets. Moreover, a driven pulley of larger diameter can accomplish a further reduction in drive sprocket relative speed of rotation. For instance, whereas 10-inch driven pulleys are normally used in conventional drives, driven pulleys of 11 or 12 inches can be readily installed, and further increases in diameter are not inconceivable. Hence most recent design snowmobiles which feature light weight and a powerful engine should be adaptable to this invention.

In exceptionally heavy and/or underpowered vehicles, the ratio reduction must be effected by a step-down mechanism of some sort, and in the absence of a chain system, a reduction gearbox can be used. In particular, a reduction gearbox can be mounted between the driven pulley and the drive sprocket on the inner face of the left side vertical wall of chassis 28.

Two examples will now be given in which a snowmobile embodying the invention is being compared with a conventional drive snowmobile.

EXAMPLE I

A high performance twin-cylinder two-cycle engine yielding a maximum power of the order of 80 hp with a displacement of 776 cc was installed on a snowmobile chassis of which the inverted U-shaped channel had been raised a maximum of 3 inches at the front. The drive pulley was rotated 180° and coupled to an 11 inch driven pulley in direct engagement with the drive sprocket axle. The drive sprockets had seven teeth and operated a 2-inch pitch endless track 15 inches wide. The total weight was 339 pounds.

It was found that the above noted exemplary embodiment was slightly superior in acceleration as well as in top speed when compared with a snowmobile of similar design of the same weight, using an identical engine but with a conventional "chain case" transmission system geared for optimum performance.

EXAMPLE II

A standard performance single cylinder two-cycle engine displacing 340 cc for a maximum power of about 22 hp is used with a transmission in accordance with the invention on a 220 pound snowmobile. The drive sprockets had six teeth, and the chassis had been raised a maximum of 2 inches at its forward region. The driven pulley had a diameter of 11 inches.

This machine proved to be slightly superior in maximum speed and acceleration to a similar snowmobile of the same weight with an identical engine and conventional transmission.

It was also discovered that a snowmobile having a transmission system in accordance with this invention can easily be dismantled in a few minutes whereas from about 15 to 30 minutes may be necessary to a skilled hand to take apart the chain mechanism and then the drive axle on a conventional snowmobile.

Figure 5:
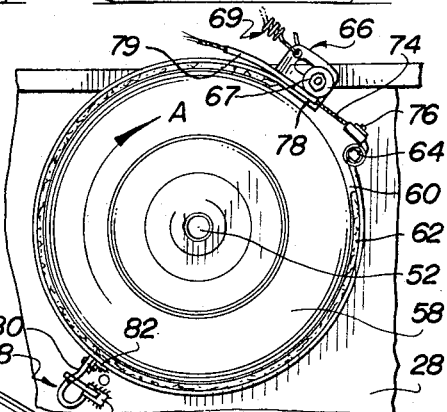
FIG. 5 is an enlarged view of the brake mechanism illustrated in FIG. 4.
Figure 4:
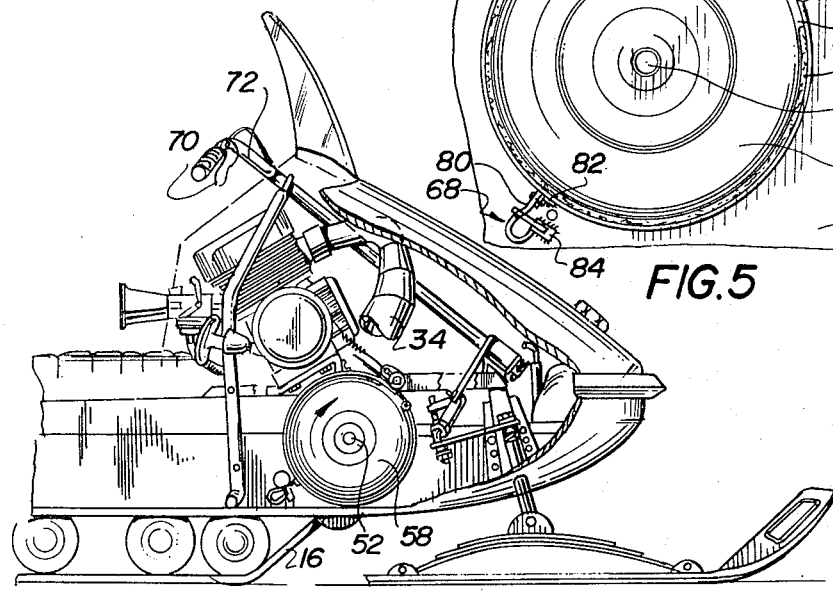
FIG. 4 is a side elevational cut-away view as seen from the left of FIG. 2.

The invention also enables the use of a large size drum brake mechanism operable directly upon the drive sprocket axle. Referring to FIGS. 4 and 5, the braking means consists of flanged disc 58 rigidly mounted on sprocket axle 52 presenting a cylindrical braking surface 60, a circular brake band 62 with a brake lining on its inner surface, an anchoring lug or post 64 adapted to retain one end of brake band 62 fixed with respect to the vehicle's chassis 28, sliding guide means 66 permitting arcuate displacement of the other end of brake band 62, with respect to retainer 67, resilient means 68 and 69, and brake actuating means adapted to releasably close the brake band 62 around the flange of disk 58. Brake actuating means includes a brake actuating lever 70 carried on handlebar 72 and a boden cable 74 of conventional construction, leading from lever 70 through sleeve 78 connected to slide 66 to cable connector 76, supported on brake band 62. Brake band 62 is preferably made from an elongated strip of steel of sufficient width and thickness to adequately support the brake lining and shaped into a circle of greater diameter than that of disc 58 so as to keep the inner face of its brake lining normally spaced apart therefrom. Resilient means 68 is a rubber element 80 stretching between a lug 82 welded onto brake band 62 and an anchoring lug 84 secured to chassis 28. The function of resilient means 68 is to resiliently return the intermediate region of brake band 62 to its rest position and damp vibration thereof upon release of the brake actuating means. In operation, actuation of lever 70 causes the sheath 79 surrounding the wire 74 to urge the sleeve 78 and hence also its respective end of band 62 connected to slide 66 towards the other end of the band 62 connected at 76 against the action of return spring 69 and rubber element 80 and against the stiffens of brake band 62 thereby causing engagement of the lining of band 62 with the cylindrical flange at the periphery of disc 58. It will be seen that upon engagement of the lining with flanged disc 58 rotating in the direction of arrow A (FIG. 5), the end of brake band 62 adjacent sliding guide means 66 will tend to move toward anchoring post 64 and accordingly further the frictional engagement of the lining with flanged disc 58. This is due to the fact that the anchored end of the brake band leads the sliding guide means in relation to the normal direction of rotation of disc 58. The resulting self-braking action can significantly reduce the effort required on the part of the operator at the brake lever 70.

A brake mechanism as shown in FIG. 5 which produced satisfactory results on the vehicle of EXAMPLE I above noted used a brake band made of a ⅛-inch thick steel strip 1 inch wide with a ¼-inch thick friction lining riveted thereto, and the diameter of disc 58 having a 1-inch flange was 10 inches.

Although the invention above has been described in relation to one specific form of the invention, it is evident that it can be modified and varied in various ways. It is therefore wished to have it understood that the present invention is not limited in interpretation except by the terms of the following claims.

What is claimed is:

1. A snowmobile comprising in combination:
an elongated chassis;
an engine mounted on the forward end of said chassis and having a crankshaft extending outwardly therefrom;
an endless track mounted beneath the chassis and a drive sprocket axle in driving engagement with the track;
a variable speed transmission system interconnecting the crankshaft and the drive sprocket axle, comprising,
   1. an axially expansible drive pulley including a pair of belt engaging members and mounted on the crankshaft for rotation therewith, the member located interiorly toward the engine being slidable axially on the crankshaft to provide said expansion and the other member farthest from the engine being fixed to the crankshaft,
   2. an axially expansible driven pulley including a pair of belt engaging members mounted on an end of the drive sprocket axle for rotation therewith, the member located interiorly toward the track being fixed on the drive sprocket axle and the other member farthest from the track being slidable axially on the drive sprocket axle to provide said expansion, and
   3. an endless V-belt operatively connecting said drive pulley and said driven pulley so that torque at the engine crankshaft is transmitted directly to the drive sprocket axle via the drive and driven pulleys.

2. A snowmobile according to claim 1 in which the track drive sprocket on the drive sprocket axle has six to seven teeth, and the driven pulley has a diameter of 11 to 12 inches.

3. A snowmobile according to claim 1, wherein said drive pulley is mounted on an extension of the crankshaft fixed to the crankshaft for rotation therewith.

4. A variable speed transmission system as defined in claim 1 wherein brake means are provided to act directly upon the drive sprocket axle at the extremity thereof opposite from said driven pulley.

5. A variable speed transmission system as defined in claim 4 wherein said brake means consist of a flanged disc fixed on said drive sprocket axle, of a brake band spaced circumferentially from said disc and of means for bringing said brake band into frictional engagement with the flange of said disc.

6. A snowmobile comprising, in combination:
an elongated inverted U-shaped chassis;
a suspended endless track beneath the U-shaped chassis;
a drive sprocket axle rotatably mounted transversely of said chassis at the forward region thereof and having a drive sprocket thereon in driving engagement with said endless track;

at least one steerable ski disposed forwardly of said track and control means for said ski;

an engine mounted on the forward end of the chassis and having a crankshaft extending horizontally outwardly therefrom;

a variable speed transmission system interconnecting the crankshaft and the drive sprocket axle, comprising:

1. an axially expansible drive pulley including a pair of belt engaging members and mounted on the crankshaft for rotation therewith, the member located interiorly toward the engine being slidable axially on the crankshaft to provide said expansion and the other member farthest from the engine being fixed to the crankshaft,
2. an axially expansible driven pulley including a pair of belt engaging members mounted on an end of the drive sprocket axle for rotation therewith, the member located interiorly toward the track being fixed on the drive sprocket axle and the other member farthest from the track being slidable axially on the drive sprocket axle to provide said expansion, and
3. an endless V-belt operatively connecting said drive pulley and said driven pulley so that torque at the engine crankshaft is transmitted directly to the drive sprocket axle via the drive and driven pulleys.

7. A snowmobile as defined in claim 6 including a brake mechanism comprising a peripherally flanged disc fixedly mounted onto the end of said drive sprocket axle opposite from the driven pulley, a brake band carrying a friction lining disposed around the flange of said disc to encircle the major proportion thereof, anchoring means for retaining one end of said brake band against rotation with said disc, sliding guide means adapted to allow the other end of said brake band arcuate displacement along the periphery of said disc with respect to said chassis, actuating means adapted to releasably close said brake band around said flange and resilient means adapted to return said brake band to its release position upon release of said actuating means.

8. A snowmobile as defined in claim 7 wherein said anchoring means is disposed forwardly of said sliding guide means in relation to the direction of rotation of said disc when said snowmobile proceeds forwardly.

9. A snowmobile according to claim 6 in which the top of the chassis is inclined upwardly forwardly such that the engine is mounted on the raised forward part of the chassis, and the top run of said endless track also is raised relative to the rear end thereof.

10. A snowmobile according to claim 9, wherein said motor is mounted on the chassis inclined upwardly and rearwardly so as to avoid interference with said means for controlling the said at least one steerable ski.

* * * * *